2,878,131
PERLITE INSULATION MATERIAL
Harry H. Houston, Elmhurst, Ill., and Louis S. McCollum, North Hollywood, Calif., assignors to International Minerals & Chemical Corporation, a corporation of New York
No Drawing. Application October 28, 1957
Serial No. 692,590
6 Claims. (Cl. 106—62)

This invention relates to an improved light-weight thermal insulating material. More particularly, it relates to an insulating material comprised of firmly adhering particles of expanded perlite, basic magnesium carbonate, asbestos and clay.

Heretofore, the well-known "85% magnesia insulation" has been used extensively as a thermal insulating material. The term "magnesia" is a misnomer when applied to the magnesium-bearing constituent of this type of thermal insulation, since magnesia is magnesium oxide (MgO), but the material used in the preparation of the so-called "85% magnesia insulation" is generally a basic magnesium carbonate. Basic magnesium corbonate or "technical carbonate" is believed to have the chemical formula $3MgCO_3.Mg(OH)_2.3H_2O$. This compound may be prepared by the well-known Pattinson process in which dolomitic rock, containing essentially an equimolar mixture of calcium carbonate and magnesium carbonate is calcined, and the calcined product is hydrated with water to form a slurry of hydroxides of calcium and magnesium. Carbon dioxide is passed through the slurry to form insoluble calcium carbonate and a solution of magnesium bicarbonate. After separation of insolubles from the slurry, the solution is heated rapidly to temperatures above 200° F. to precipitate insoluble basic magnesium carbonate. Other methods of preparing basic magnesium carbonate are disclosed by Greider et al., U. S. Patent No. 2,275,032 and by Miller, U. S. Patent No. 2,330,836.

Eighty-five percent magnesia insulation material is prepared by admixing basic magnesium carbonate and asbestos in a weight ratio of 85 parts of the carbonate per 15 parts of asbestos. The mixture is agitated with water to form a substantially homogeneous slurry and then filter pressed into cakes or bricks. The cakes or bricks are dried in steam heated kilns for about 3 days. After drying, the cakes may be cut or shaped into pipe insulating forms, slabs, bricks, and the like.

The extensive period of time necessary to filter the aqueous slurry of the carbonate and asbestos and to dry the filter cake reduces substantially the capacity of the processing equipment and thereby adds substantially to the cost of preparing the 85% magnesia insulation material.

It is a primary object of this invention to overcome the disadvantages inherent in previously known methods of preparing thermal insulating materials containing basic magnesium carbonate.

It is another object of the invention to provide a novel, light-weight thermal insulating material suitable for use at temperatures up to about 1400° F.

Another object of the invention is to provide an improved method of preparing a thermal insulating material containing a basic magnesium carbonate in which the time necessary to filter the slurry of solid components is substantially reduced.

It is still another object of the invention to provide an improved method of preparing a thermal insulating material containing basic magnesium carbonate in which the time necessary to dry the moist filter cake is substantially reduced.

It is a further object of this invention to provide a novel thermal insulating material containing expanded perlite and basic magnesium carbonate which has a thermal conductivity coefficient equal to or less than the coefficient of standard 85% magnesium insulating material.

These and other objects and advantages of the invention will be readily apparent from the following detailed description.

Now it has been discovered that an improved light-weight thermal insulating material may be prepared from expanded perlite, basic magnesium carbonate, asbestos and clay. The novel insulating material is prepared by admixing expanded perlite, basic magnesium carbonate, asbestos and clay in an aqueous medium to form a substantially homogeneous slurry, filtering the slurry and heating the moist filter cake until substantially free of moisture.

More in detail, fine expanded perlite particles having a diameter between about 5 and about 175 microns are preferably used to prepare the novel insulating material, but coarser or finer particles may be used if desired. Fine expanded perlite particles are produced in the various perlite expansion or "popping" processes producing light-weight aggregates, filter aids, and the like. For example, perlite ore may be crushed to pass through a screen of about 4 mesh and sized at about 45 mesh to recover a —4 +45 mesh fraction and a —45 mesh fraction. The —4 +45 mesh perlite particles are expanded by heating to a temperature between about 1500° F. and about 2100° F. in a vertical shaft furnace or other expansion furnace used by the perlite industry. Expanded perlite from the expansion furnace is subjected to a size separation step in a cyclone separator or other air classification apparatus. Coarse particles from the sizing step are suitable for use as a light-weight aggregate in plaster, concrete, and the like. Fine particles from the sizing step, substantially all of which are less than about 175 microns in diameter, are suitable for use in the preparation of the instant novel insulating material.

In the production of filter aid from perlite, the —45 mesh perlite particles from the above-mentioned sizing step are expanded as described above. Expanded perlite from the furnace may be comminuted and sized by air classification and the like. Coarse comminuted expanded perlite from this sizing step is suitable for use as a filter aid. Fine expanded comminuted perlite, substantially all of which is less than about 175 microns in diameter is suitable for use as a component of the novel insulating material.

While two methods of preparing fine expanded perlite have been described, expanded perlite fines prepared by other processes may also be used as a component of the novel insulating material. If desired, expanded perlite having a particle size of the order of about —45 +100 mesh, such as the filter aid material prepared as described above, may also be used as a component of the novel insulating material.

A fibrous asbestos is also used as a component of the novel insulating material. Any type of fibrous asbestos may be used, but it is preferred to use an alkaline asbestos such as chrysotile. An approximate chemical analysis of chrysotile is as follows:

| Component: | Approximate percent by weight |
|---|---|
| $SiO_2$ | 37–44 |
| MgO | 39–44 |
| FeO | 0–6.0 |
| $Fe_2O_3$ | 0.1–5.0 |
| $Al_2O_3$ | 0.2–1.5 |
| CaO | Trace–5.0 |
| $H_2O$ | 12.0–15.0 |

Chrysotile fibers are flexible and have considerable tensile strength. These fibers usually range in length from less than about 1/8" to about 1", but shorter or longer fibers may be present. A typical screen analysis of chrysotile fibers is as follows:

| Screen size: | Weight percent |
|---|---|
| +10 mesh | 6.2 |
| −10 +20 | 26.2 |
| −20 +40 | 27.2 |
| −40 +70 | 6.2 |
| −70 +100 | 2.0 |
| −100 | 31.8 |

It will be recognized that the above mentioned chemical and screen analyses of chrysotile are merely approximate and that the chemical and screen analyses of chrysotile may vary depending upon its source.

An acidic activated bentonite clay is preferably used as a component of the novel insulating material, but any naturally activated or synthetically activated clay of the non-swelling montmorillonite variety may be used. Bentonite clay mined in the vicinity of Olancha, California, which has been admixed with an aqueous aluminum sulfate solution and heated to a temperature of about 450° F. in a suitable heating apparatus such as a rotary kiln has been found to be particularly suitable as a component of the novel insulating material. It is preferred to use clay particles all of which have a diameter less than about 100 microns, but coarser or finer particles may be used if desired.

The acidity of the clay is preferably sufficient to form a slurry having a pH of between about 4 and about 6, and preferably between about 4.5 and about 5.5 when the slurry is prepared by mixing about 2 grams of clay with about 10 ml. of water. The presence of a bentonite clay of this type in the mixture used to prepare the novel insulating material is believed to accelerate filtration of the slurry and improve cohesion of the solid material after filtration and drying.

The following table sets forth the amounts of solid materials, in terms of percent by weight on a dry basis, that are used in the preparation of the novel insulating material.

TABLE I

| Component | Percent by Weight on a Dry Basis | |
|---|---|---|
| | Preferred Range | Range |
| Expanded Perlite Fines | 40-42 | 20-55 |
| Basic Magnesium Carbonate | 40-42 | 30-65 |
| Asbestos | 13-15 | 10-17 |
| Clay | 5-7 | 3-10 |

Solid components in the above mentioned amounts are mixed with water in a suitable container provided with an agitating means. Sufficient water is used to form an aqueous slurry of between about 10% and about 25% solids by weight. The slurry of solid components is agitated until substantially homogeneous and then filtered in a suitable filtration apparatus such as a pan filter. If desired, the slurry may be filtered in a suitable mold having a filter medium base. Generally, the slurry is filtered in an amount to form a filter cake having a thickness between about 2.5" to 5". However, other shapes having different dimensions may also be prepared. Because of the porous nature of the expanded perlite particles and because of the presence of the bentonite clay, the filtration of the slurry is extremely rapid and may be as much as 10 times the filtration rate of the conventional slury of "85% magnesia" and asbestos.

After filtration, the filter cake is placed in a suitable drying apparatus such as a tunnel kiln where it is heated to a temperature between about 220° F. and about 240° F. for between about 2 and about 6 hours until substantially free of moisture.

The dry filter cake may be cut into blocks of desired dimensions and used as insulation for boilers, tanks and other large radiating surfaces. The dry filter cake may also be trimmed and formed into half-cylinder sections which are rolled in glued canvas jackets in the conventional manner to form an insulating covering for pipes. The novel insulating material may also be used as batt insulation in residences between rafters, joists, studs, and the like.

Insulating material prepared in accordance with the above-mentioned procedure may be used up to temperatures of about 1400° F. without any substantial deterioration.

The density of the novel light weight insulating material may be as low as 6 pounds per cubic foot, as compared to a density of about 15 to 20 pounds per cubic foot for conventional 85% magnesia insulation. The flexural strength of the novel insulation material is comparable to that of conventional 85% magnesia insulation material.

The thermal conductivity coefficient, K (B. t. u.-inches per hour-square foot-°F.) of the novel insulating material at temperatures of about 300° F. lies between about 0.22 and about 0.38, the coefficients of expanded perlite fines and 85% magnesia insulation respectively.

As illustrative of the character of the instant invention, but in no way intending to be limited thereto, the following example is described. All parts and percentages are by weight unless otherwise specified.

*Example*

Expanded comminuted perlite was prepared by heating crushed perlite ore in a vertical expansion furnace at a temperature of about 1600° F. to cause expansion of the perlite. After expansion, the expanded particles were comminuted and subjected to a size separation in a cyclone separator. An approximate screen analysis of the fine particles recovered from the cyclone overflow was as follows:

| Screen Size | Percent Passing Through Screen |
|---|---|
| 80 mesh | 95.8 |
| 100 mesh | 93.8 |
| 150 mesh | 89.7 |
| 200 mesh | 85.7 |
| 325 mesh | 75.1 |

Expanded perlite (43 parts) was mixed with basic magnesium carbonate (42 parts), chrysotile asbestos (15 parts), and acidic activated bentonite clay (5 parts). The activated clay was prepared by admixing bentonite clay mined in the vicinity of Olancha, California, with an aqueous aluminum sulfate solution in an amount equivalent to about 4% $Al_2(SO_4)_3$, based on the combined weight of $Al_2(SO_4)_3$ and clay. The mixture of clay and aluminum sulfate was then heated to a temperature of about 450° F. The pH of a slurry prepared by admixing one gram of activated clay with 5 ml. of water was about 4.6.

The mixture of expanded perlite, basic magnesium carbonate, asbestos, and clay was commingled with 300 parts of water to form a homogeneous slurry, and the slurry was filtered. The filtration rate of the slurry was about 15 gallons per hour per square foot. The filter cake was placed in a kiln and heated to a temperature of about 220° F. for about 4 hours. The density of the dried filter cake was about 6 pounds per cubic foot.

The dried filter cake was suitable for use as an insulating material at temperatures up to about 1400° F. without substantial deterioration.

Having now thus fully described and illustrated this invention, what is desired to be secured by Letters Patent is:

1. A thermal insulating material capable of withstanding temperatures up to about 1400° F. without substantial deterioration comprised essentially of a mixture of expanded perlite, basic magnesium carbonate, asbestos and activated clay, said perlite comprising between about 20% and about 55% by weight, said carbonate comprising between about 30% and about 65% by weight, said asbestos comprising between about 10% and about 17% by weight, and said clay comprising between about 3% and about 10% by weight of said material.

2. A thermal insulating material capable of withstanding temperatures up to about 1400° F. without substantial deterioration comprised essentially of a mixture of between about 40% and about 42% by weight of expanded perlite, between about 40% and about 42% by weight of basic magnesium carbonate, between about 13% and about 15% by weight of chrysotile asbestos, and between about 5% and about 7% by weight of acidic activated bentonite clay.

3. The method of preparing a thermal insulating material which comprises the steps of preparing an aqueous slurry of expanded perlite, basic magnesium carbonate, asbestos and activated clay, said perlite comprising between about 20% and about 55% by weight, said carbonate comprising between about 30% and about 65% by weight, said asbestos comprising between about 10% and about 17% by weight, and said clay comprising between about 3% and about 10% by weight of the solids in said slurry, admixing the slurry until substantially homogeneous, filtering the slurry, recovering the moist filter cake, and heating said filter cake to dryness.

4. The thermal insulating material of claim 1 wherein substantially all of the expanded perlite particles have a diameter between about 5 and about 175 microns.

5. The thermal insulating material of claim 1 wherein the clay is an acidic activated bentonite clay.

6. The method of claim 3 wherein the moist filter cake is heated to dryness at a temperature of between about 220° F. and about 240° F.

References Cited in the file of this patent

UNITED STATES PATENTS

| | | |
|---|---|---|
| 1,279,975 | Boeck et al. | Sept. 24, 1918 |
| 2,634,207 | Miscall et al. | Apr. 7, 1953 |